United States Patent
Kwak et al.

(10) Patent No.: US 12,235,243 B2
(45) Date of Patent: Feb. 25, 2025

(54) COVER UNIT OF ULTRASONIC TRANSDUCER

(71) Applicants: CENTER FOR ADVANCED META-MATERIALS, Daejeon (KR); PUSAN NATIONAL UNIVERSITY INDUSTRY-UNIVERSITY COOPERATION FOUNDATION, Busan (KR)

(72) Inventors: Jun Hyuk Kwak, Sejong-si (KR); Kyung Jun Song, Busan (KR); Jong Jin Park, Sejong-si (KR); Hak Joo Lee, Daejeon (KR)

(73) Assignees: CENTER FOR ADVANCED META-MATERIALS, Daejeon (KR); PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 470 days.

(21) Appl. No.: 17/741,524

(22) Filed: May 11, 2022

(65) Prior Publication Data

US 2022/0268742 A1 Aug. 25, 2022

Related U.S. Application Data

(63) Continuation of application No. PCT/KR2020/014240, filed on Oct. 19, 2020.

(30) Foreign Application Priority Data

Nov. 11, 2019 (KR) .................... 10-2019-0143828

(51) Int. Cl.
*G10K 11/00* (2006.01)
*G01N 29/24* (2006.01)
*G01N 29/28* (2006.01)

(52) U.S. Cl.
CPC ......... *G01N 29/28* (2013.01); *G01N 29/2487* (2013.01); *G10K 11/002* (2013.01)

(58) Field of Classification Search
CPC ... G01N 29/28; G01N 29/2487; G10K 11/002
See application file for complete search history.

(56) References Cited

U.S. PATENT DOCUMENTS

| 2003/0011285 A1 | 1/2003 | Ossmann |
| 2013/0241355 A1* | 9/2013 | Okada .................. H10N 30/101 29/25.35 |

(Continued)

FOREIGN PATENT DOCUMENTS

| CN | 104068890 A | 10/2014 |
| KR | 10-2004-0014982 A | 2/2004 |

(Continued)

OTHER PUBLICATIONS

International Search Report for PCT/KR2020/014240 mailed Jan. 27, 2021 from Korean Intellectual Property Office.

*Primary Examiner* — Krystine E Breier
(74) *Attorney, Agent, or Firm* — Revolution IP, PLLC

(57) ABSTRACT

A cover unit includes: a body to which an ultrasound generator adapted to generate ultrasound is coupled; first slits disposed at a lower portion of the body in the form of multiple rings having different radii and spaced apart from each other, the first slits having a first width; second slits depressed from an upper surface of the body to communicate with the first slits and having a second width smaller than the first width; third slits depressed from the upper surface of the body and each disposed between adjacent second slits, the third slits having a third width smaller than the first width; a bottom formed under the first slits; a first sidewall formed between adjacent first slits; and a second sidewall formed between the second slit and the third slit.

11 Claims, 2 Drawing Sheets

(56) References Cited

U.S. PATENT DOCUMENTS

| | | | |
|---|---|---|---|
| 2013/0293066 A1* | 11/2013 | Tsuzuki | B32B 38/0004 |
| | | | 310/334 |
| 2014/0296712 A1 | 10/2014 | Kiyose | |
| 2016/0051225 A1 | 2/2016 | Kim et al. | |
| 2016/0187301 A1 | 6/2016 | Gu | |
| 2017/0156697 A1* | 6/2017 | Cho | A61B 8/00 |
| 2019/0216428 A1 | 7/2019 | Gu et al. | |
| 2021/0101178 A1* | 4/2021 | Kim | G02B 3/08 |

FOREIGN PATENT DOCUMENTS

| | | |
|---|---|---|
| KR | 10-2016-0023154 A | 3/2016 |
| KR | 10-2016-0079336 A | 7/2016 |
| KR | 10-2019-0086915 A | 7/2019 |

* cited by examiner

【FIG. 1】
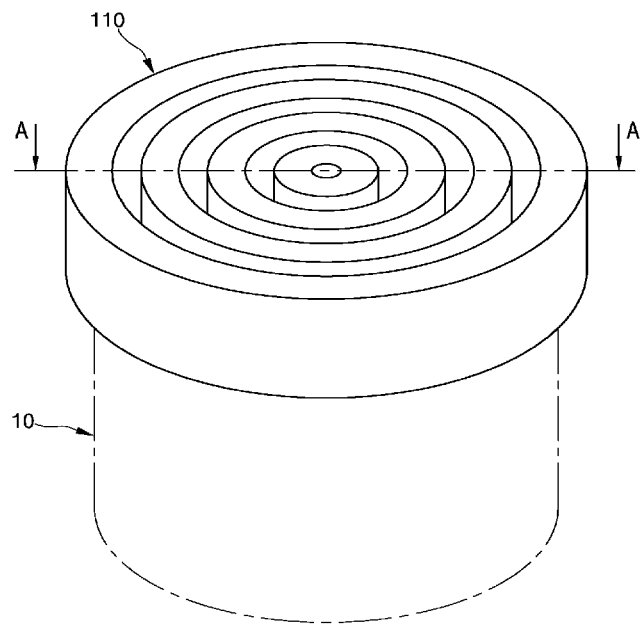
【FIG. 2】
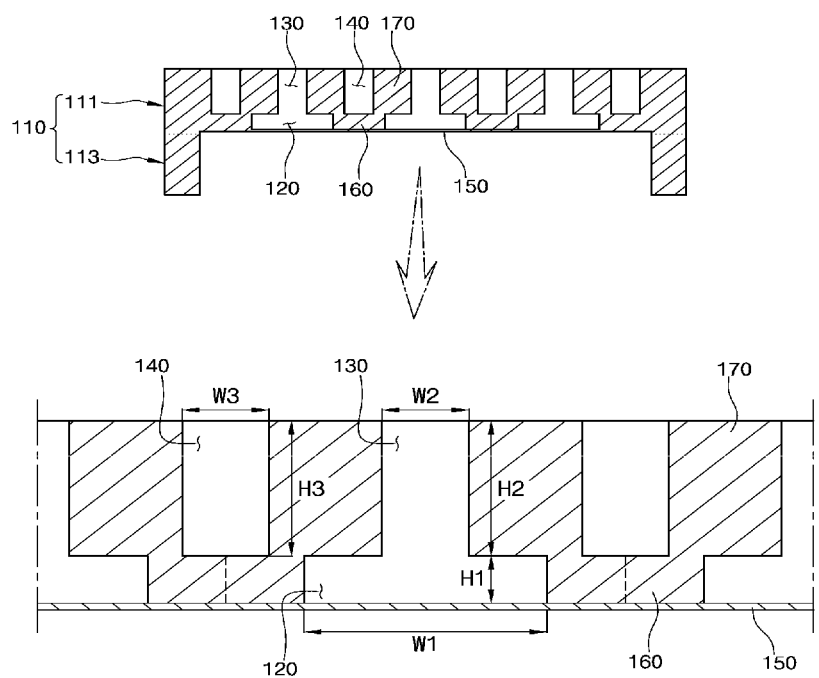

[FIG. 3]
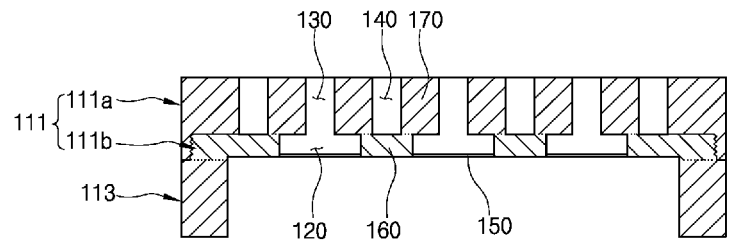
[FIG. 4]
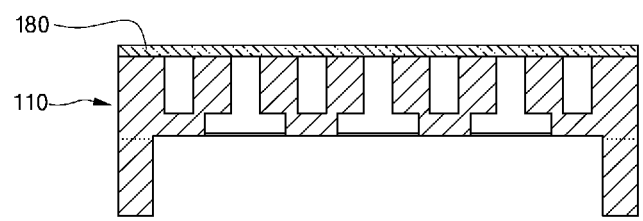
[FIG. 5]
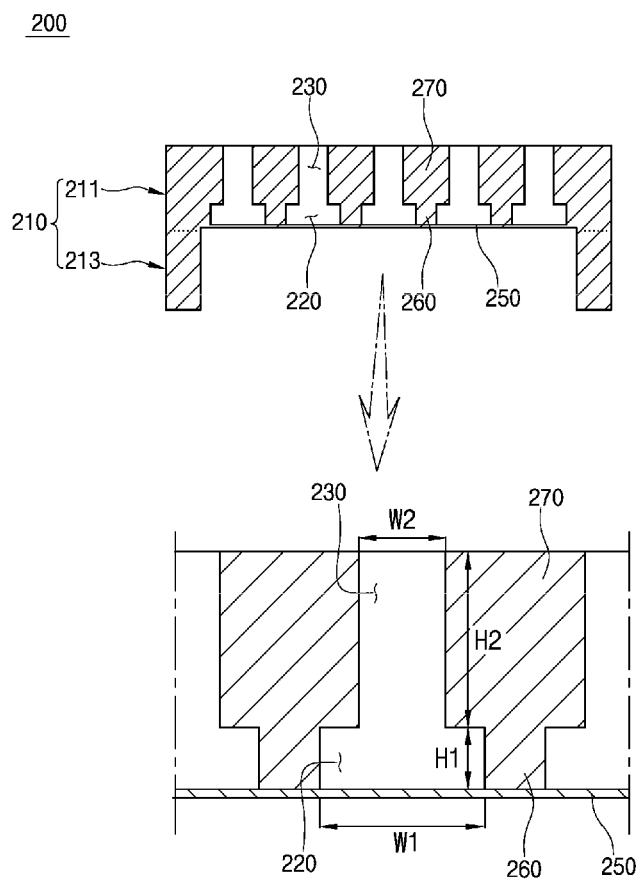

COVER UNIT OF ULTRASONIC TRANSDUCER

TECHNICAL FIELD

The present invention relates to a cover unit for ultrasonic transducers, and particularly to a cover unit for ultrasonic transducers, which can emit high power ultrasound signals through amplification of ultrasound signals generated from an ultrasound generator.

BACKGROUND ART

Ultrasound or ultrasound means periodic acoustic pressure having frequencies exceeding the maximum human audible range and corresponds to a sound wave above a frequency of about 20 kHz (20,000 Hz).

Ultrasound is generally used in various fields, such as penetration of media, measurement of echo waves, supply of concentrated energy, and the like. For example, an ultrasound examination apparatus emits the ultrasound to a subject, such as a person, an animal, an object, and the like, detects an ultrasound signal reflected from the subject, and displays a tomographic image of tissue in the subject on a monitor to provide information necessary for examination of the subject.

Propagation of ultrasound is realized by energy transfer through a medium. When the ultrasound passes through a certain medium, the ultrasound is affected by intrinsic acoustic impedance of the medium. For example, the ultrasound is relatively poorly transmitted in air and is transmitted well in liquids or solids. An examination apparatus using ultrasound may be classified into a contact type and a non-contact type based on a corresponding medium.

Contact type ultrasound examination uses a liquid or a solid as a medium and is generally used due to good transmission output of the ultrasound, as described above. However, since contact type ultrasound examination is performed by placing the liquid or solid in a space between a probe and a subject, the subject is frequently exposed to the liquid or solid and it is difficult to apply contact type ultrasound examination when a fine roughness or a porous tissue is present on a surface of the subject.

Non-contact type ultrasound examination uses air as a medium and allows non-contact examination without direct contact with a subject. Thus, non-contact type ultrasound examination prevents contamination of the subject, can be effectively used even when the fine roughness or the porous tissue is present on the surface of the subject, and can be broadly used in the field of non-destructive examination of composite materials used in aviation, space, building materials, and the like. However, non-contact type ultrasound examination does not allow sufficient penetration of a large quantity of acoustic wave energy into a material due to a difference in acoustic impedance between air and a target material, as compared to the contact type ultrasound examination. That is, the non-contact type ultrasound examination provides an ultrasound signal having lower power or a lower signal-to-noise ratio than the contact type ultrasound examination. Thus, for improvement in performance of the non-contact type ultrasound examination, there is a need for amplification of an ultrasound signal received by or transmitted from the probe.

In general, ultrasonic transducers used in various industries are required to meet certain minimum safety requirements and standards. Such requirements include protection of a device from scattering particles and unintentional or accidental impacts, resistance to corrosion from media which the transducers are brought into contact with, chemical stability to prevent contamination of a subject, wide tolerances for static or dynamic pressure variation, and the like.

Currently, for protection of the ultrasonic transducer, a metallic protective layer is often attached to a front side of a piezoelectric element of the ultrasonic transducer. However, due to addition of the protective layer to an ultrasound passage, reflection, scattering, and sharp resonant peaks of sound waves are generated at a layer to which the protective layer is coupled or at an interface of the protective layer, thereby reducing the received signal.

Therefore, there is a need for development of a novel ultrasonic transducer that can satisfy requirements for high power and durability.

DISCLOSURE

Technical Problem

Embodiments of the present invention are conceived to solve such problems in the art and it is an object of the present invention to provide a cover unit for ultrasonic transducers, which can emit high power ultrasound signals through amplification of ultrasound signals generated from an ultrasound generator.

Technical Solution

In accordance with one embodiment of the present invention, a cover unit for ultrasonic transducers adapted to radiate high power ultrasound signals through amplification of ultrasound upon reception of the ultrasound includes: a body to which an ultrasound generator adapted to generate ultrasound is coupled; first slits disposed at a lower portion of the body in the form of multiple rings having different radii and spaced apart from each other, the first slits having a first width; second slits depressed from an upper surface of the body to communicate with the first slits and having a second width smaller than the first width; third slits depressed from the upper surface of the body and each disposed between adjacent second slits, the third slits having a third width smaller than the first width; a bottom formed under the first slits; a first sidewall formed between adjacent first slits; and a second sidewall formed between the second slit and the third slit.

In the cover unit, the second width may be the same as the third width; and the second slits and the third slits formed parallel to a traveling direction of sound waves may have the same depth.

In the cover unit, the body may include: an upper body formed with the first slits, the second slits, the third slits, the bottom, the first sidewall, and the second sidewall; and a lower body protruding from the upper body to form an interior space to which the ultrasound generator can be coupled.

In the cover unit, the upper body may be manufactured by 3D printing.

In the cover unit, the upper body may include: a first upper body formed with the second slits, the third slits, and the second sidewall; and a second upper body formed with the first slits, the bottom, and the first sidewall, and the first upper body may be detachably coupled to the second upper body.

The cover unit may further include a protective film coupled to the upper surface of the body and blocking foreign matter from entering the first slits, the second slits and the third slits.

In accordance with another embodiment of the present invention, a cover unit for ultrasonic transducers adapted to radiate high power ultrasound signals through amplification of ultrasound upon reception of the ultrasound includes: a body to which an ultrasound generator adapted to generate ultrasound is coupled; first slits disposed at a lower portion of the body in the form of multiple rings having different radii and spaced apart from each other, the first slits having a first width; second slits depressed from an upper surface of the body to communicate with the first slits and having a second width smaller than the first width; a bottom formed under the first slits; a first sidewall formed between adjacent first slits; and a second sidewall formed between adjacent second slits.

In the cover unit, the body may include an upper body formed with the first slits, the second slits, the bottom, the first sidewall, and the second sidewall; and a lower body protruding from the upper body to form an interior space to which the ultrasound generator can be coupled.

In the cover unit, the upper body may be manufactured by 3D printing.

In the cover unit, the upper body may include: a first upper body formed with the second slits and the second sidewall; and a second upper body formed with the first slits, the bottom, and the first sidewall, and the first upper body may be detachably coupled to the second upper body.

The cover unit may further include a protective film coupled to the upper surface of the body and blocking foreign matter from entering the first slits, the second slits and the third slits.

Advantageous Effects

The cover unit according to the present invention is formed to have a resonant frequency coincident with an operation frequency of ultrasound radiated from the ultrasound generator, thereby improving ultrasound output through amplification of the ultrasound radiated from the ultrasound generator by a resonance phenomenon.

The cover unit according to the present invention can be easily assembled to the ultrasound generator, can protect the ultrasound generator from external impact or media, can be easily manufactured due to a simple structure thereof, and enables reduction in weight and size of the ultrasonic transducer.

DESCRIPTION OF DRAWINGS

FIG. 1 is an exemplary perspective view of a cover unit for ultrasonic transducers according to a first embodiment of the present invention.

FIG. 2 is an exemplary sectional view taken along line A-A of FIG. 1.

FIG. 3 is an exemplary sectional view of modification of the cover unit for ultrasonic transducers according to the first embodiment of the present invention.

FIG. 4 is an exemplary sectional view of another modification of the cover unit for ultrasonic transducers according to the first embodiment of the present invention.

FIG. 5 is an exemplary perspective view of a cover unit for ultrasonic transducers according to a second embodiment of the present invention.

MODE FOR INVENTION

Hereinafter, preferred embodiments of the present invention will be described with reference to the accompanying drawings. In description of the embodiments, the same components will be denoted by the same terms and the same reference numerals and repeated description thereof will be omitted.

FIG. 1 is an exemplary perspective view of a cover unit for ultrasonic transducers according to a first embodiment of the present invention and FIG. 2 is an exemplary sectional view taken along line A-A of FIG. 1.

Referring to FIG. 1 and FIG. 2, an ultrasonic transducer cover unit 100 according to the first embodiment may be disposed on an ultrasound traveling path and may be coupled to an ultrasound radiation surface of an ultrasound generator 10.

That is, as shown in FIG. 1, the ultrasound generator 10 may radiate ultrasound in an upward direction and the cover unit 100 may be coupled to an upper portion of the ultrasound generator 10. Thus, when the cover unit 100 receives the ultrasound through a lower surface thereof, the cover unit 100 may radiate the ultrasound through an upper surface thereof after amplification of the received ultrasound.

The cover unit 100 according to the first embodiment includes a body 110, first slits 120, second slits 130, third slits 140, a bottom 150, a first sidewall 160, and a second sidewall 170.

The body 110 may be coupled to the ultrasound generator 10. That is, the body 110 may be coupled to the radiation surface of the ultrasound generator 10 and may protect the ultrasound generator 10 from external impact or media.

The first slits 120 may be formed at a lower portion of the body 110 to face the ultrasound generator 10 and may be disposed in the form of multiple rings having different radii and spaced apart from each other. Each of the first slits 120 may have a first width W1 and a first depth H1.

The second slits 130 may be formed at an upper portion of the body 110 and may be depressed from the upper surface of the body 110 to communicate with the first slits 120. Each of the second slits 130 may have a second width W2 and a second depth H2. The second width W2 may be smaller than the first width W1 and the second depth H2 may be greater than the first depth H1.

Each of the third slits 140 may be formed at the upper portion of the body 110 and may be depressed from the upper surface of the body 110 to be disposed between adjacent second slits 130. Each of the third slits 140 may have a third width W3 and a third depth H3. The third width W3 may be smaller than the first width W1 and the third depth H3 may be greater than the first depth H1.

The second slits 130 and the third slits 140 may be formed such that the second width W2 is the same as the third slits 140. In addition, the second slits 130 and the third slits 140 may be formed such that the second depth H2 is the same as the third depth H3.

The bottom 150 may be formed under the first slits 120 and may connect the multiple first slits 120 disposed in a ring shape to each other.

The bottom 150 may be provided in a bar shape in a diametric direction of the cover unit 100 such that the first sidewall 160 and the second sidewall 170 disposed in a ring shape and described below can be coupled and secured to the bottom 150. Thus, a lower portion of each of the first slits 120 may be partially closed by the bottom 150 and most of the lower portion of each of the first slits 120 may be open.

The bottom 150 is a portion of the cover unit brought into close contact with the ultrasound radiation surface of the ultrasound generator 10 upon coupling of the cover unit 100 to the ultrasound generator 10 and may have a thickness depending upon an operation frequency of ultrasound generated from the ultrasound generator 10. That is, the thickness of the bottom 150 may be designed based on the operation frequency of the ultrasound generator 10 to which the cover unit 100 is coupled.

In addition, the bottom 150 may be removed prior to coupling and securing the cover unit 100 to the ultrasound generator 10. That is, the cover unit 100 may be coupled to the ultrasound generator 10, with the bottom 150 removed therefrom.

The first sidewall 160 may be formed between the adjacent first slits 120. That is, the first slits 120 may be spaced apart from each other by the width of the first sidewall 160.

The second sidewall 170 may be formed between the second slit 130 and the third slit 140 adjacent to each other. That is, the second slit 130 and the third slit 140 may be spaced apart from each other by the width of the second sidewall 170.

As shown in the drawings, each of the first slits 120, the second slits 130, the third slits 140, the first sidewall 160, and the second sidewall 170 may be formed in a circular ring shape or in a tetragonal ring shape.

In the cover unit 100, ultrasound received through a lower surface of the cover unit 100 is amplified by resonance of the first slits 120 and resonance of the second slits 130 and the third slits 140, whereby the cover unit 100 can emit the amplified ultrasound through the upper surface thereof.

Referring again to FIG. 2, the body 110 according to the first embodiment may include an upper body 111 and a lower body 113.

The upper body 111 corresponding to a part for amplification of the ultrasound may be formed with the first slits 120, the second slits 130, the third slits 140, the bottom 150, the first sidewall 160, and the second sidewall 170. The upper body 111, which is formed with the first slits 120, the second slits 130, the third slits 140, the bottom 150, the first sidewall 160 and the second sidewall 170, may be manufactured by 3D printing. Alternatively, the upper body 111 may be manufactured by various machining methods other than 3D printing.

The lower body 113 corresponding to a part of the cover unit to which the ultrasound generator 10 is coupled may protrude from the upper body 111 to form an interior space to which the ultrasound generator 10 is coupled. That is, the lower body 113 may extend downwards from an edge portion of the upper body 111 such that at least part of the ultrasound generator 10 is received in the lower body 113.

An inner peripheral surface of the lower body 113 may be coupled to an outer peripheral surface of the ultrasound generator 10 through a fastening portion. For example, the outer peripheral surface of the ultrasound generator 10 may be formed with a first thread and the inner peripheral surface of the lower body 113 may be formed with a second thread that can be screwed to the first thread. Accordingly, the cover unit can be firmly coupled to the ultrasound generator 10 while allowing easy separation therefrom.

The upper body 111 and the lower body 113 may be formed of the same material and may be integrally formed with each other. Alternatively, the upper body 111 and the lower body 113 may be formed of different materials and may be coupled to each other by a fastening member after being individually manufactured.

As such, the upper body 111 serving to amplify ultrasound and the lower body 113 to which the ultrasound generator 10 is coupled may be individually manufactured, thereby facilitating manufacture of the first slits 120, the second slits 130, the third slits 140, the bottom 150, the first sidewall 160 and the second sidewall 170 for amplification of the ultrasound.

FIG. 3 is an exemplary sectional view of modification of the cover unit for ultrasonic transducers according to the first embodiment of the present invention.

Referring to FIG. 3, the upper body 111 may include a first upper body 111a and a second upper body 111b.

The first upper body 111a may be formed with the second slits 130, the third slits 140 and the second sidewall 170, and the second upper body 111b may be formed with the first slits 120, the bottom 150 and the first sidewall 160.

The first upper body 111a may be detachably coupled to the second upper body 111b.

The first upper body 111a may be coupled to the second upper body 111b through a fastening portion. For example, an inner peripheral surface of a lower end of the first upper body 111a may be formed with a first thread and an outer peripheral surface of an upper end of the second upper body 111b may be formed with a second thread.

In the body 110 according to the present invention, each of the first slits 120 may be connected to the second slit 130 to define a slit space having a structure in which a lower side of the slit space is wide and an upper side of the slit space is narrow. Such a structure can provide difficulty in machining. That is, since the first slits 120 are formed to have the first width W1 greater than the widths of the second slits 130, there can be difficulty in general machining.

However, according to this embodiment, the first upper body 111a formed with the second slits 130 and the third slits 140, and the second upper body 111b formed with the first slits 120 are individually manufactured, thereby allowing more precise and easier machining of the first slits 120, the second slits 130 and the third slits 140.

When damage, for example, corrosion, of the first upper body 111a brought into contact with a medium occurs, only the first upper body 111a can be replaced with a new upper body, thereby achieving cost reduction while improving efficiency in maintenance and management of the cover unit.

The body 110 according to the present invention may be manufactured by 3D printing. In this case, the first slits 120, the second slits 130 and the third slits 140 may be more precisely and easily formed.

FIG. 4 is an exemplary sectional view of another modification of the cover unit for ultrasonic transducers according to the first embodiment of the present invention.

Referring to FIG. 4, the cover unit 100 according to the first embodiment may further include a protective film 170 formed on one ultrasound radiation surface thereof, that is, on the upper surface of the body 110, to block foreign matter from entering the first slits 120, the second slits 130 and the third slits 140.

The protective film 180 may be realized by a lightweight flexible film, such as a thin film and the like, or a metal sheet, for example, aluminum, stainless steel, copper, mesh, and the like. Alternatively, the protective film 180 may be realized by a polymer sheet, such as polyvinyl chloride (PVC) and the like.

The protective film 180 may have a pore having a diameter of 10 μm or less to block foreign matter contained in a medium, such as air and the like, from entering the interior of the cover unit 100.

Next, a cover unit for ultrasonic transducers according to a second embodiment of the present invention will be described.

FIG. 5 is an exemplary perspective view of a cover unit for ultrasonic transducers according to a second embodiment of the present invention. In description of the second embodiment, repeated description of the same component as those of the first embodiment will be minimized.

Referring to FIG. 5, the ultrasonic transducer cover unit 200 according to the second embodiment may also be disposed on a traveling path of ultrasound and may be coupled to the ultrasound radiation surface of the ultrasound generator 10 (see FIG. 1).

The cover unit 200 according to the second embodiment includes a body 210, first slits 220, second slits 230, a bottom 250, a first sidewall 260, and a second sidewall 270.

The body 210 may be coupled to the ultrasound generator. That is, the body 210 may be coupled to the radiation surface of the ultrasound generator 10 and may protect the ultrasound generator from external impact or media.

The first slits 220 may be formed at a lower portion of the body 210 to face the ultrasound generator and may be disposed in the form of multiple rings having different radii and spaced apart from each other. Each of the first slits 220 may have a first width W1 and a first depth H1.

The second slits 230 may be formed at an upper portion of the body 210 and may be depressed from the upper surface of the body 210 to communicate with the first slits 220. Each of the second slits 230 may have a second width W2 and a second depth H2. The second width W2 may be smaller than the first width W1 and the second depth H2 may be greater than the first depth H1.

The bottom 250 may be formed under the first slits 220 and may connect the multiple first slits 220 disposed in a ring shape to each other. The bottom 250 may be provided in a bar shape in a radial direction of the cover unit 200 such that the first sidewall 260 and the second sidewall 270 disposed in a ring shape and described below can be coupled and secured to the bottom.

The bottom 250 is a portion of the cover unit brought into close contact with the ultrasound radiation surface of the ultrasound generator 10 upon coupling of the cover unit 200 to the ultrasound generator 10 (see FIG. 1) and may have a thickness depending upon an operation frequency of ultrasound generated from the ultrasound generator 20. That is, the thickness of the bottom 250 may be designed based on the operation frequency of the ultrasound generator 10 to which the cover unit 200 is coupled.

In addition, the bottom 250 may be removed prior to coupling and securing the cover unit 200 to the ultrasound generator 10. That is, the cover unit 200 may be coupled to the ultrasound generator 10, with the bottom 250 removed therefrom.

The first sidewall 260 may be formed between the adjacent first slits 220. That is, the first slits 220 may be spaced apart from each other by the width of the first sidewall 260.

The second sidewall 270 may be formed between adjacent second slits 230. That is, the second slit 230 and the third slit 240 may be spaced apart from each other by the width of the second sidewall 270.

As shown in the drawings, each of the first slits 220, the second slits 230, the first sidewall 260, and the second sidewall 270 may be formed in a circular ring shape or in a tetragonal ring shape.

In the cover unit 200, ultrasound received through a lower surface of the cover unit 200 is amplified by resonance of the first slits 220 and resonance of the second slits 230 thereof, whereby the cover unit 200 can emit the amplified ultrasound through the upper surface thereof.

As in the first embodiment, the body 210 according to the second embodiment may include an upper body and a lower body. That is, the upper body 111 corresponding to a part for amplification of the ultrasound may be formed with the first slits 220, the second slits 230, the bottom 250, the first sidewall 260 and the second sidewall 270, and the lower body corresponding to a part of the cover unit to which the ultrasound generator is coupled may protrude from the upper body to form an interior space to which the ultrasound generator is coupled.

As in the first embodiment, the upper body according to the second embodiment may also include a first upper body and a second upper body. That is, the first upper body formed with the second slits 230 and the second sidewall 270 is detachably coupled to the second upper body formed with the first slits 220, the bottom 250 and the first sidewall 260.

In addition, the cover unit 200 according to the second embodiment may further include a protective film formed on one ultrasound radiation surface thereof, that is, on the upper surface of the body, to block foreign matter from entering the first slits 220 and the second slits 230.

The present invention is characterized in that the first slits 120; 220 having a greater width than the second slits 130; 230 are formed under the second slits 130; 230.

If the body 110 is formed with the second slits 130 alone, impedance mismatch occurs due to a difference in impedance between the radiation surface of the ultrasound generator 10 and air inside the second slits 130 in the course where the ultrasound generated from the ultrasound generator 10 is transferred to the second slits 130, thereby causing significant reduction in energy of the ultrasound.

In order to prevent such reduction in transferred energy, an air layer having a thin thickness is preferably formed between an ultrasound amplification unit and the ultrasound generator 10. Resonance caused by the air layer is combined with resonance caused by the second slits 130 to generate impedance mismatch, thereby minimizing reduction in transferred energy.

However, there is difficulty realizing the air layer in actual ultrasound amplification products. In addition, although there is a need for adjustment in thickness of the air layer depending upon the wavelength of the ultrasound generated from the ultrasound generator 10, it is difficult to adjust the thickness of the air layer in an actual product.

Thus, in the present invention, the first slits 120; 220 having a relatively great width are formed under the second slits 130; 230, thereby easily realizing the air layer for the ultrasound amplification unit. Further, the thickness of the air layer may also be adjusted through adjustment in depth H1 of the first slits 120; 220.

Although exemplary embodiments have been described herein, it should be understood that these embodiments are provided for illustration only and are not to be construed in any way as limiting the present invention, and that various modifications, changes, or alterations can be made by those skilled in the art without departing from the spirit and scope of the present invention.

INDUSTRIAL APPLICABILITY

The present invention has industrial applicability in the field of ultrasonic transducer technology that radiates high power ultrasound signals through amplification of ultrasound generated from an ultrasound generator.

The invention claimed is:

1. A cover unit for ultrasonic transducers adapted to radiate high power ultrasound signals through amplification of received ultrasound, the cover unit comprising:
   a body to which an ultrasound generator adapted to generate ultrasound is coupled;
   first slits disposed at a lower portion of the body in the form of multiple rings having different radii and spaced apart from each other, the first slits having a first width;
   second slits depressed from an upper surface of the body to communicate with the first slits and having a second width smaller than the first width;
   third slits depressed from the upper surface of the body and each disposed between adjacent second slits, the third slits having a third width smaller than the first width;
   a bottom formed under the first slits;
   a first sidewall formed between adjacent first slits; and
   a second sidewall formed between a second slit of the second slits and a third slit of the third slits.

2. The cover unit for ultrasonic transducers according to claim 1, wherein:
   the second width is the same as the third width; and
   the second slits and the third slits formed parallel to a traveling direction of sound waves have the same depth.

3. The cover unit for ultrasonic transducers according to claim 1, wherein the body comprises:
   an upper body formed with the first slits, the second slits, the third slits, the bottom, the first sidewall, and the second sidewall; and
   a lower body protruding from the upper body to form an interior space to which the ultrasound generator can be coupled.

4. The cover unit for ultrasonic transducers according to claim 3, wherein the upper body is manufactured by 3D printing.

5. The cover unit for ultrasonic transducers according to claim 3, wherein the upper body comprises:
   a first upper body formed with the second slits, the third slits, and the second sidewall; and
   a second upper body formed with the first slits, the bottom, and the first sidewall, and
   the first upper body being detachably coupled to the second upper body.

6. The cover unit for ultrasonic transducers according to claim 1, further comprising:
   a protective film coupled to the upper surface of the body and blocking foreign matter from entering the first slits, the second slits and the third slits.

7. A cover unit for ultrasonic transducers adapted to radiate high power ultrasound signals through amplification of ultrasound upon reception of the ultrasound, the cover unit comprising:
   a body to which an ultrasound generator adapted to generate ultrasound is coupled;
   first slits disposed at a lower portion of the body in the form of multiple rings having different radii and spaced apart from each other, the first slits having a first width;
   second slits depressed from an upper surface of the body to communicate with the first slits and having a second width smaller than the first width;
   a bottom formed under the first slits;
   a first sidewall formed between adjacent first slits; and
   a second sidewall formed between adjacent second slits.

8. The cover unit for ultrasonic transducers according to claim 7, wherein the body comprises:
   an upper body formed with the first slits, the second slits, the bottom, the first sidewall, and the second sidewall; and
   a lower body protruding from the upper body to form an interior space to which the ultrasound generator can be coupled.

9. The cover unit for ultrasonic transducers according to claim 8, wherein the upper body is manufactured by 3D printing.

10. The cover unit for ultrasonic transducers according to claim 8, wherein the upper body comprises:
    a first upper body formed with the second slits and the second sidewall; and
    a second upper body formed with the first slits, the bottom, and the first sidewall,
    the first upper body being detachably coupled to the second upper body.

11. The cover unit for ultrasonic transducers according to claim 7, further comprising:
    a protective film coupled to the upper surface of the body and blocking foreign matter from entering the first slits, the second slits and the third slits.

* * * * *